United States Patent [19]
Cooper et al.

[11] Patent Number: 5,335,265
[45] Date of Patent: Aug. 2, 1994

[54] APPARATUS FOR DETECTING AND PREVENTING SUBSCRIBER NUMBER CLONING IN A CELLULAR MOBILE TELEPHONE SYSTEM

[75] Inventors: John R. Cooper, Tewksbury; Kenneth W. Sonberg, Medford, both of Mass.

[73] Assignee: Electronic Data Systems Corporation, Plano, Tex.

[21] Appl. No.: 88,391

[22] Filed: Jun. 30, 1993

Related U.S. Application Data

[63] Continuation of Ser. No. 790,643, Nov. 8, 1991, abandoned.

[51] Int. Cl.$^5$ .................... H04M 11/00; H04Q 7/00
[52] U.S. Cl. ................................. 379/59; 379/60; 379/62; 455/33.1; 455/33.2
[58] Field of Search ............. 379/59, 60, 62, 67, 379/88; 455/33.1, 33.2; 381/42, 43

[56] References Cited

U.S. PATENT DOCUMENTS

| | | | |
|---|---|---|---|
| 4,771,448 | 9/1988 | Koohgoli et al. | 379/59 |
| 4,776,001 | 10/1988 | Murata et al. | 379/62 |
| 4,811,377 | 3/1989 | Krolopp et al. | 379/62 |
| 4,972,479 | 11/1990 | Tobias, Jr. et al. | 379/58 |
| 4,995,083 | 2/1991 | Baker et al. | 455/33.1 |
| 5,101,501 | 3/1992 | Gilhousen et al. | 455/33.2 |

*Primary Examiner*—Stephen Chin
*Assistant Examiner*—Vijay Shankar
*Attorney, Agent, or Firm*—L. Joy Griebenow

[57] ABSTRACT

This apparatus operates to discern temporal and spatial anomalies in the use of subscriber numbers in the cellular mobile telephone system. The detection of such anomalies is typically indicative of attempted fraudulent access to the cellular mobile telephone system via cloning of valid subscriber numbers. The detection of a bogus subscriber unit is accomplished by recording the call origination and termination patterns associated with the subscriber number. The cloning detection apparatus makes use of call origination data to identify concurrent call originations or receptions for a single subscriber number. However, such events represent only a small portion of the fraudulent calls and a more extensive analysis is typically required to identify subscriber number cloning. This further analysis includes a spatial analysis of successive call activity for a subscriber number. If two successive calls for a particular subscriber number are detected in a time interval that is too short to justify the geographic separation of the subscriber unit for the two successive calls, then this apparatus identifies these two call connections as including one subscriber unit having a cloned subscriber number.

26 Claims, 5 Drawing Sheets

APPARATUS FOR DETECTING AND PREVENTING SUBSCRIBER NUMBER CLONING IN A CELLULAR MOBILE TELEPHONE SYSTEM

This application is a continuation of application Ser. No. 07/790,643, filed Nov. 8, 1991, now abandoned.

FIELD OF THE INVENTION

This invention relates to cellular mobile telephone systems and, in particular, to apparatus that detects attempts by an unauthorized user to clone valid subscriber numbers and prevents the use of these cloned numbers to originate unauthorized calls.

PROBLEM

It is a problem in the field of cellular mobile telephone systems to prevent call initiations by unauthorized users who attempt to fraudulently access the cellular mobile telephone system. There are numerous methods used to originate unauthorized calls in cellular mobile telephone systems and many of these methods are difficult to detect and prevent due to the mobile nature of the subscriber station set. One method of fraudulent access is the use of subscriber number cloning to obtain unauthorized access to the cellular mobile telephone system. Subscriber number cloning is accomplished by an unauthorized user programming a valid subscriber number into the cellular telephone station set in order to deceive the cellular mobile telephone system into providing call services to the unauthorized user. Existing cellular mobile telephone systems can not distinguish between valid and fraudulent subscriber numbers due to the fact that the subscriber station sets are mobile and are only identified to the cellular telephone system by subscriber number and unit identification number. Service can be denied to a fraudulent cloned telephone number only when the fraud is detected and the fraudulent unit distinguished from the valid subscriber unit. There presently exists no system that can provide this fraudulent unit detection and service theft prevention capability.

SOLUTION

The above described problems are solved and a technical advance achieved in the field by the apparatus for detecting and preventing subscriber number cloning in a cellular mobile telephone system. This apparatus operates to discern temporal and spatial anomalies in the use of subscriber numbers in the cellular mobile telephone system. The detection of such anomalies is typically indicative of attempted fraudulent access to the cellular mobile telephone system. In response to detected anomalies, this apparatus monitors subscriber number usage in order to identify a bogus subscriber unit. Once this bogus subscriber unit is identified, call originations by the bogus subscriber unit are denied and further theft of service prevented.

The detection of a bogus subscriber unit is accomplished by recording the call origination and termination patterns associated with the subscriber number. The present apparatus resides in a central subscriber verification system and therefore maintains records of all the subscribers presently active or authorized to originate and receive calls in the particular cellular mobile telephone service area. The cloning detection apparatus makes use of the data that is stored in the user database to identify concurrent call originations or receptions for a single subscriber number. However, such events represent only a small portion of the fraudulent calls and a more extensive analysis is typically required to identify subscriber number cloning. This further analysis includes a spatial analysis of successive call activity for a subscriber number. If two successive calls for a particular subscriber number are detected in a time interval that is too short to justify the geographic separation of the subscriber unit for the two successive calls, then this apparatus identifies these two call connections as including one subscriber unit having a cloned subscriber number. Therefore, either temporally overlapping calls or calls involving subscriber units that are geographically separated, which calls occur in a time less than the time required for the subscriber unit to transverse the geographic distance, are noted as instances of unauthorized call activity involving cloned subscriber numbers. This apparatus accomplishes these results by the use of call activity records and data indicative of the geographical location and separation among the various cell sites served by this apparatus.

Once the present of a bogus subscriber unit is detected, a calling party validation routine is activated to enable the cellular telephone system to distinguish between the valid subscriber unit and the bogus subscriber unit. The calling party validation routine makes use of additional identification steps in order to uniquely identify a valid subscriber. This validation routine can require the calling party to input a personal identification number (PIN) or initiate a landline call to an operator to register for roaming in a designated region. A speech recognition system can alternatively be used to differentiate between valid and bogus calling parties. Once a valid calling party is identified, the call origination from the associated subscriber unit is processed as with any other cellular call.

DETAILED DESCRIPTION OF THE DRAWING

DETAILED DESCRIPTION

Figure 1:
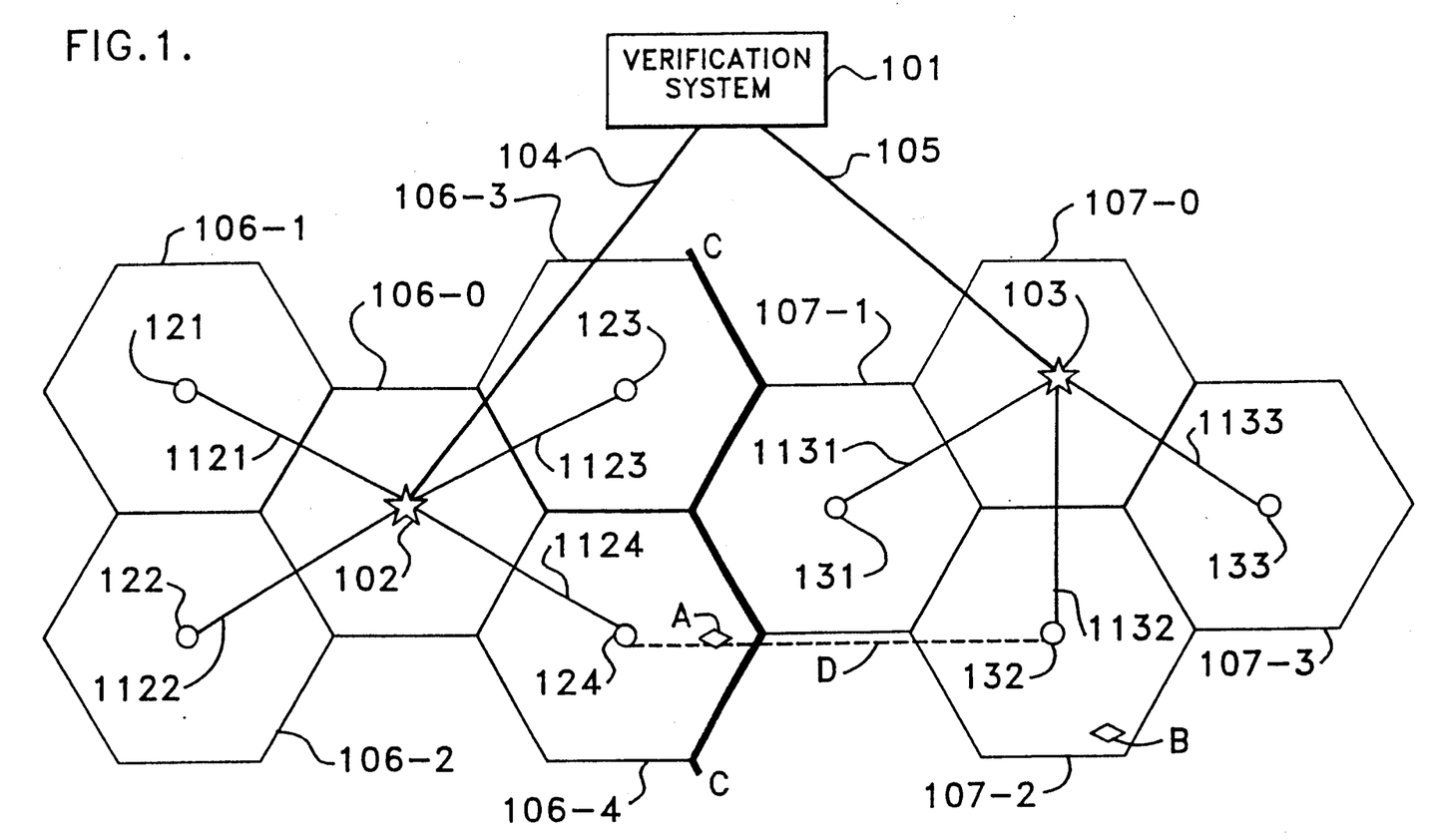
FIG. 1 illustrates in block diagram form the architecture of a typical cellular mobile telephone system.

FIG. 1 illustrates a typical cellular mobile telephone system that includes a plurality of Mobile Telephone Switching Offices (MTSO) 102, 103, each of which is connected via communication facilities 1121-1124, 1131-1133 to a plurality of cell site transmitters 121-124, 131-133. Mobile subscriber units A, B within each cell site 106, 107 can initiate or receive telephone calls via radio frequency communication with transceiver apparatus 121-124, 131-133 located in their corresponding cell site 106, 107. A plurality of cell sites 106 are interconnected with a designated Mobile Telephone Switching Office 102 which serves to interconnect the transceivers 121-124 in the various cell sites 106 served by the Mobile Telephone Switching Office 102 with the Public Switched Telephone Network (PTSN) (not shown) to access other Mobile Telephone Switching Offices as well as conventional telephone apparatus.

The range of a particular cellular service is determined by the geographic location of the cell sites. In addition, cellular mobile telephone systems are not connected on a nationwide basis. Rather, the industry consists of many distinct geographical regions that service a specific "home" base of subscribers. For example, in FIG. 1 the bold line C-C denotes a boundary between two cellular regions, with Mobile Telephone Switching Office 102 being located in a first of these regions and Mobile Telephone Switching Office 103 being located in a second juxtaposed region. When cellular subscribers leave their home geographical region they become "roamers". When a roaming subscriber places a cellular telephone call, the foreign system that provides service has no way of determining if this roamer is a valid subscriber or not, since this information is located in the roamer's home system. Obtaining the information from the home switch, and notifying the foreign system of the roamer status is the purpose of the roamer verification system, illustrated in FIG. 1. The cellular mobile telephone system generally includes apparatus to maintain data concerning each subscriber authorized to initiate and receive calls within the cellular mobile telephone network. These subscribers include subscribers for whom the local Mobile Telephone Switching Office 102 is their base switch and roamers who are subscribers from other service areas who have entered or are passing through this service area. The subscriber validation apparatus can be included in each of the Mobile Telephone Switching Offices 102, 103 and coordinated therebetween or may reside in a central clearinghouse location (roamer Verification System 101) to serve a plurality of the Mobile Telephone Switching Office 102, 103. For the purpose of this description, assume that a subscriber validation apparatus is located in roamer verification system 101 which is interconnected via data link or dial up communication facilities 104, 105 with the plurality of Mobile Telephone Switching Offices 102, 103 illustrated in FIG. 1 as well as others not shown thereon. The apparatus illustrated in FIG. 1, are well known in the cellular mobile telephone industry and represent the basic systems within which the apparatus of the present invention cooperatively operates.

The cellular mobile telephone network operates much as a conventional land line telephone switching network with the exception that the subscriber units A, B are mobile and must therefore include a method of uniquely identifying each mobile subscriber unit operational within each service area. Furthermore, these mobile subscriber units A, B are typically in motion during the call connection and the communication between the mobile subscriber unit A and the cell site transmitters 121-124 must be dynamically configured in response to the movements of the particular mobile subscriber unit A. In order to uniquely identify a mobile subscriber unit as a billable entity, each mobile subscriber unit must be assigned a direct dial telephone number, referred to as the Mobile Identification Number (MIN), as well as an equipment identification number, referred to as the Electronic Serial Number (ESN), to enable other subscribers to call this particular mobile subscriber unit and to enable the cell site transmitters to uniquely identify this mobile subscriber unit A among the many that are operational in the service area.

Fraudulent Call, Activity—Cloning

It is obvious that the accurate recordation of call activity is dependent on the ability of the cellular mobile telephone network to uniquely identify each mobile subscriber unit operating within the service area as a billable entity. This goal is easily thwarted by a user who programs their cellular mobile subscriber unit B with the identification assigned by the cellular mobile telephone network to a valid mobile subscriber unit A operational within the service area. This bogus mobile subscriber unit B can then initiate cellular calls using the cloned subscriber number and existing cellular mobile telephone systems are unable to identify that this bogus mobile subscriber unit B is not authorized to receive service. Cloning of subscriber numbers is a significant problem in the cellular communication industry and it accounts for significant lost revenues due to the fact that the subscriber whose number has been cloned requires the common carrier to delete the calls initiated by the bogus mobile subscriber unit from the account billing records. This theft of service is thwarted by the apparatus of the present invention, which maintains records of subscriber call activity to detect temporal and spatial anomalies therein.

Architecture of Cloning Detection Apparatus

Figure 2:
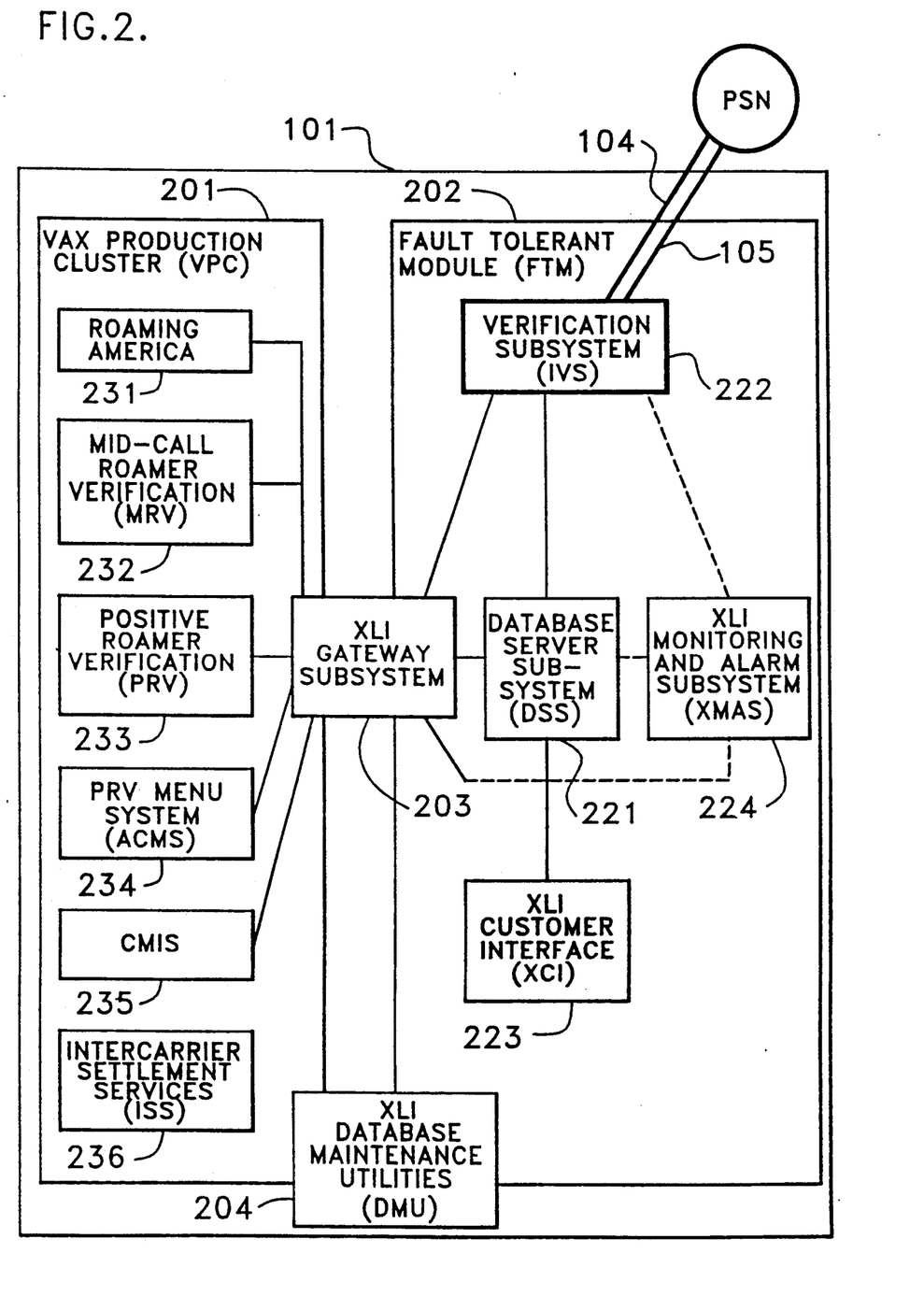
FIGS. 2 and 3 illustrate in block diagram form architectural details of the apparatus of the present invention.
Figure 3:
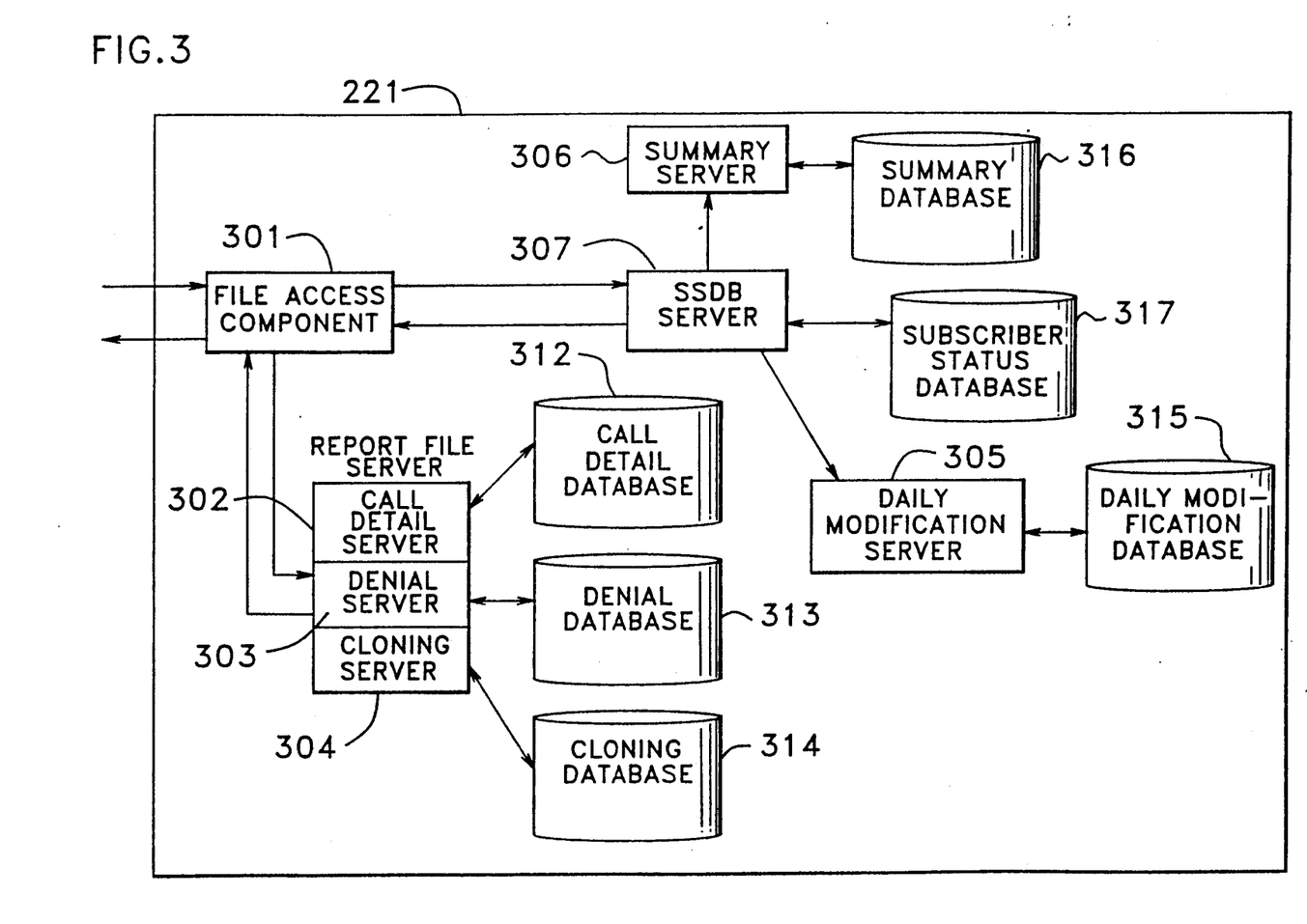

FIGS. 2 and 3 illustrate in block diagram form the apparatus of the present invention which is used to detect the presence of a mobile subscriber unit B that has been programmed with a cloned subscriber number and to disable such bogus mobile subscriber unit B from receiving communication services in this cellular service area. For the purpose of this invention, it is assumed that this cloning detection apparatus is located within the roamer verification system 101 noted above. The installation of this cloning detection apparatus therein provides a greater areal coverage and therefore enables this cloning detection apparatus to identify and locate the bogus mobile subscriber unit even though it may roam from one service area to another.

This cloning detection apparatus includes a database that contains information concerning the geographical location of the plurality of cell site transmitters located within the service area covered by this particular apparatus. This location information includes distances between various cell site transmitters. The apparatus of the present invention monitors at least one of the following criteria in identifying a cloned subscriber telephone number:

1. The same MIN/ESN is observed roaming and at home at virtually the same time.
2. The same MIN/ESN is observed roaming at two different roaming locations at virtually the same time.
3. The same MIN/ESN is observed at different cell sites within its home system at virtually the same time.
4. A MIN/ESN exceeds a certain number of calls in a predefined period of time.
5. A MIN/ESN exceeds a certain amount of air time in a predefined period of time.

Once cloning is detected by use of these criteria, one of a plurality of subscriber validation processes can be enabled in order to distinguish between the valid mobile subscriber unit and the bogus mobile subscriber unit. These various validation processes can be preselected by the cellular telephone system subscriber to whom the valid subscriber unit is assigned, or by the cellular communication system administrator or only a single of these capabilities may be provided within the serving cellular communication system. These subscriber validation procedures can include but are not limited to: requesting the subscriber unit to transmit a personal identification code that uniquely identifies a subscriber to whom the subscriber unit is assigned, comparing voice transmissions from this subscriber unit with voice printed data that uniquely identifies a subscriber that is assigned to this subscriber unit or automatically routing this call origination to an operator. This last option includes forwarding an alarm containing the MIN/ESN and the call detail that caused the alarm to a customer service terminal. The customer service personnel have the option to suspend service for that MIN/ESN or communicate with the subscriber to determine the true nature of the situation. If cloning is suspected, the customer service representative disables the MIN/ESN associated with the suspected bogus customer service unit. This information is input into the subscriber verification database and causes a service denial message to be transmitted to each cellular communication system in which the subscriber attempts to activate service.

The roamer verification system 101 provides the cloning detection capability by using a data interface and data links 104, 105 to exchange subscriber and call related data with a plurality of mobile telephone switching offices 102, 103. The roamer verification system 101 includes a subscriber status database (SSDB) which is the single repository for roamer status information. When cellular telephone calls are originated by a roaming subscriber, the roaming subscriber's identification is checked against the data stored in the subscriber status database to determine whether this is an authorized user. The determination made by the roamer verification system 101 is transmitted back to the mobile telephone switching office that originated the subscriber validation request.

Implementation Details of Cloning Detection Apparatus

FIGS. 2 and 3 illustrate a portion of the architecture of the roamer verification system 101 that pertains to the cloning detection capability. The roamer verification system 101 includes, in the preferred embodiment, two processor complexes 201, 202 which provide the computing power necessary to manage the validation and billing of the number of roaming subscribers found in the cellular mobile telephone network. The VPC processor 201 typically consists of a VAX/VMS processor complex manufactured by Digital Equipment Corporation of Maynard, Mass. The VPC processor 201 provides many of the existing roamer validation services, such as the Roaming America service 231 and the Positive Roamer Verification service 233 offered by Appex Corporation as well as operator interface and maintenance software. The VPC processor 201 additionally includes intercarrier settlement services software 236 which records all the billing data for the various service entities that are connected to the roamer verification system 101.

The FTS processor 202 consists of a Stratus SA 2000 fault tolerant processor complex upon which the cloning detection software is implemented. The FTS processor 202 includes two transaction processing systems: database server system (DSS) 221 and verification system (VS) 222. The database server system 221 controls access to the subscriber status database 317 and other databases 312-316 used by the verification system 222. Verification system 222 provides verification services to mobile telephone switching offices 102, 103 that are served by the roamer verification system 101. The interface between the roamer verification system 101 and the plurality of Mobile Telephone Switching Offices 102, 103 is implemented in the XLI gateway system 203 which is a message handler that simplifies the intercommunication between the various connected entities.

Verification System

The verification system 222 provides roamer verification services for a plurality of mobile telephone switching offices 102, 103. The verification system 222 receives qualification request invokes from Mobile Telephone Switching Offices 102, 103 via an X.25 packet switching network illustrated diagrammatically on FIG. 1 as data links 104, 105. Alternatively, intercommunication can be accomplished using the SS7 networking protocol. In either case, upon receipt of a qualification request, the verification system 222 transmits an inquiry to database server system 221 to determine the status of the roaming subscribing unit B which is requesting service in one of the Mobile Telephone Switching Offices (103). The database server system 221 determines the status of the roaming subscriber unit B by retrieving data associated with that designated subscriber unit B from the subscriber status database 317. The retrieved data is then transmitted by database server subsystem 221 to the verification system 222 wherein a determination is made whether the requesting subscriber unit B is authorized to receive the service it has requested. The verification system 222 accesses routing information from its own internal memory that enables it to respond to the Mobile Telephone Switching Office 102 on either a per NPA-NXX or on a per roaming location basis. Based on the status contained in the subscriber status database, the verification system 222 transmits a qualification request to the Mobile Telephone Switching Office 103 in which the requesting subscriber unit B is presently located. The verification system 222 then determines whether sufficient data is contained in the subscriber status database 317 to make a determination of the authorization of this requesting subscriber unit B. If not, an information request message is transmitted to the home Mobile Telephone Switching Office ex 102 assigned to the requesting subscriber unit B to obtain sufficient subscriber data to make an authorization determination. When the response to this inquiry is received by the verification system 222 it transmits an update to the database server system 221 which accordingly updates the subscriber status database 317 for this requesting subscriber unit B. A complete record of all transaction activity is maintained for both daily and online reporting. If the data collected by verification system 222 indicates that the roaming subscriber unit B is authorized to receive the requested service, an authorization request message is transmitted to the Mobile Telephone Switching Office 103 in whose service area the roaming subscriber unit B is presently located. In response to the received message from the roamer verification system 101, the Mobile Telephone Switching Office 103 provides the requested call connections to subscriber unit B.

Database Server System

The database server system 221 provides and controls access not only to the subscriber system database 317 but also to a denial database 313, call detail database 312 and a cloning database 314. The subscriber status database 317 is the single repository of roamer status information for all roaming subscriber units served by the Mobile Telephone Switching Offices 102, 103 connected to the roamer verification system 101. It thereby provides timely access to roamer status information. The database server system 221 also maintains summary statistics on subscriber status database usage for monitoring and reporting purposes. It also maintains a record of all updates made to the subscriber status database 317 on a daily basis.

As illustrated in FIG. 3, the database server system 221 is comprised of seven functional components:
1. File access component 301.
2. Subscriber summary database server 306.
3. Subscriber status database server 307.
4. Call detail server 302.
5. Denial server 303.
6. Cloning server 304.
7. Daily modification database server 305.

The file access component 301 is the entrance and exit point for all messages destined for the above listed database 302-307 servers. Access to the databases 312-317 within this system occurs directly with the servers 302-307 for those files.

File Access Controller

The file access controller 301 is responsible for receiving messages from other processes within the roamer verification system 101 and forwarding them to the appropriate subscriber status database server. The file access controller 301 is also responsible for returning responses to the process that originated the message. It is obvious that within this system there are a plurality of processes that are not described herein that are standard for a database of this type. These processes include additions to the database, modifications to the database, inquiries and updates. For the purpose of simplifying this description, only details concerning detection of cloned subscriber numbers is presented.

Call Processing

When a roaming subscriber unit B originates a call in one of the cell sites 106 served by a Mobile Telephone Switching Office 103, this is accomplished in well known fashion by roaming subscriber unit B interacting with cell site transmitter 124 to establish a radio frequency link therebetween. Once the radio frequency link has been established between cell site transmitter 124 and roaming subscriber unit B, data messages are transmitted over data link 1124 from cell site transmitter 124 to Mobile Telephone Switching Office 103. Mobile Telephone Switching Office 103 recognizes the request for a call origination and the fact that roaming subscriber unit B is not one of the subscriber units whose home base is Mobile Telephone Switching Office 103. Due to the fact that information concerning roaming subscriber unit B is not contained within the database internal to Mobile Telephone Switching Office 103, control messages are thereby transmitted by this switching office 103 by data link 105 to roamer verification system 101 to obtain information concerning the authorization of roaming subscriber unit B to originate and receive cellular service. This is accomplished by Mobile Telephone Switching Office 103 transmitting a call detail notification message to the roamer verification system 101. This is received by the XLI gateway system 203 and forwarded to the verification system 221 for processing therein. When the verification system 222 receives a roamer verification request, it transmits a message to the database server system 221 which message contains the following information:
1. Mobile identification number (MIN).
2. Electronic Serial Number (ESN).
3. Roam Switch Identifier.
4. Roam Switch System Identifier.

This same information is also transmitted to the call detail server 303 for entry into the call detail database 313.

Figure 4:
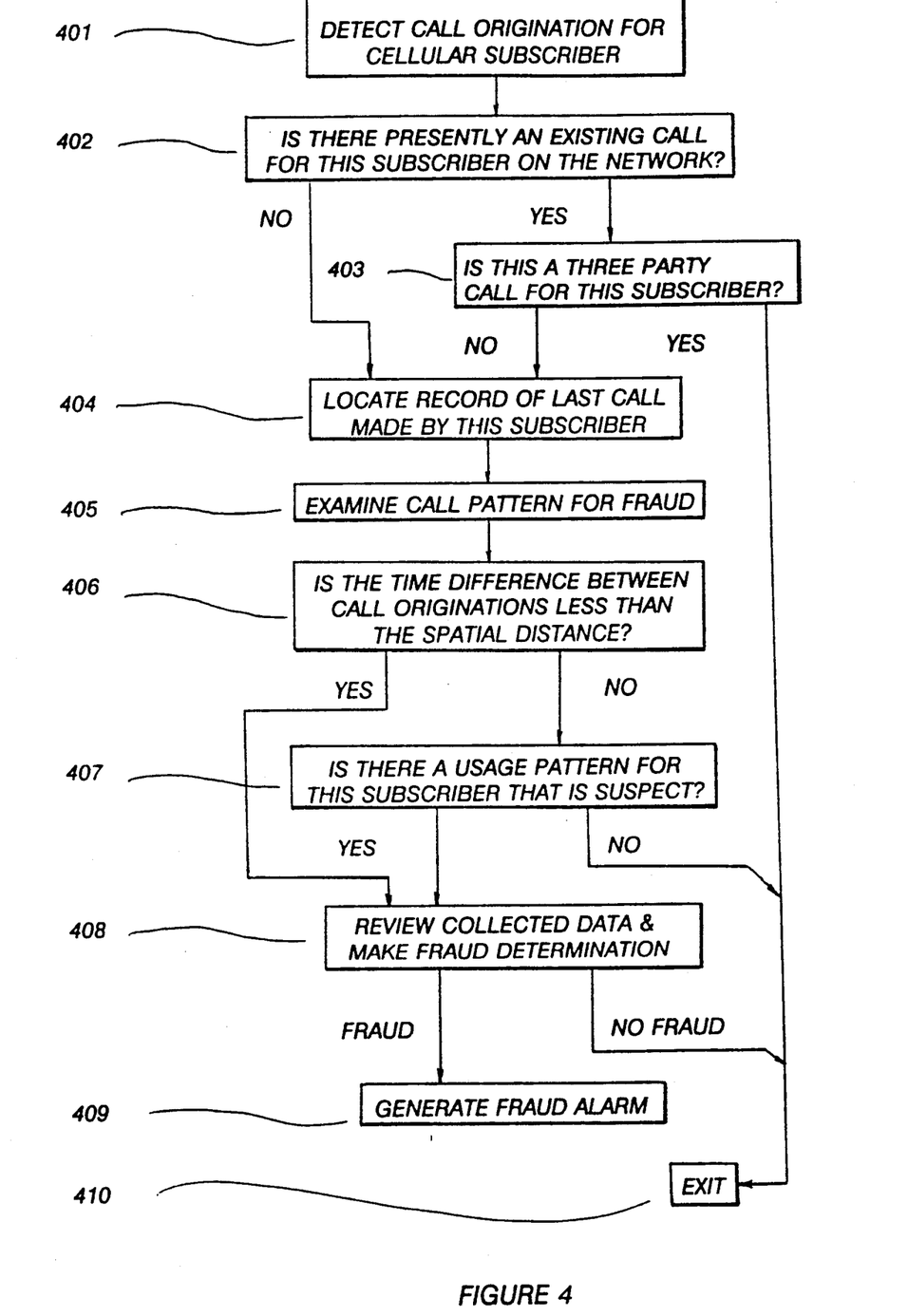
FIGS. 4 and 5 illustrate in flow diagram form the operational steps taken by this apparatus to detect subscriber units containing cloned subscriber numbers.

FIG. 4 illustrates in flow diagram form the operational steps taken by this roamer verification system 101 to identify a bogus call originated by a subscriber. At step 401, the cellular telephone system 103 detects a call origination for a particular cellular subscriber B. As part of the standard subscriber validation process, at step 402 a determination is made whether there is presently an existing call for this subscriber on the cellular telephone switching network. If there is presently an active call extant on the cellular telephone switching network at step 403, a determination is made whether this new call origination detected at step 401 represents an addition of a third party on a three party call for the subscriber. If, at step 403, it is determined that this is a three party processing terminates since this represents a valid call condition. If, at step 403 it is determined that this is not a three party call, processing advances to step 409 where the validation process is activated in order to determine which of the active calls on the cellular telephone network is associated with a valid subscriber and which of these two calls is associated with an individual who has originated a bogus call.

If, at step 402 it is determined that the existing call is the only one active in the cellular telephone network for the subscriber, processing advances to step 404 where the verification system locates the call detail records in call detail database 312 indicative of the last call made by the subscriber unit B. At step 405, the call patterns are examined to determine whether there is an indication that fraudulent call originations are associated with the subscriber unit B. In particular, at step 406 the time difference between successive call originations is compared to the spatial distance between the sites of the successive call originations to determine if there are temporal and spatial anomalies in the call originations. This is accomplished by identifying the network and cell site within the network that is associated with subscriber unit B originating the call. This data is included in the call detail record stored in call detail database 312 and therefore, on successive calls a temporal and spatial differentiation between these successive calls can be made in order to identify anomalies. In particular, each call origination is time stamped so that the time difference between successive call originations is easily determined by calculating the time difference between the successive time stamps. The spatial distance is a more complex determination and requires the use of tables 1 and 2 which are stored in the memory of the subscriber validation software. These tables indicate the spatial distance between networks and between cell sites within a network. Therefore, if the two successive call originations are within a single network, than the distance in time units between the cell sites associated with each of the calls is determined and compared to the time difference determined by reviewing the time stamp of the successive call originations.

TABLE 1

| CELL SITE | 101 | 102 | 103 | 104 |
|---|---|---|---|---|
| 101 | 0 | 1.7 | 2.9 | 1.2 |
| 102 | 1.7 | 0 | 7.1 | 3.0 |
| 103 | 2.9 | 7.1 | 0 | 1.1 |
| 104 | 1.2 | 3.0 | 1.1 | 0 |

TABLE 2

| NETWORK | 1 | 2 | 3 |
|---|---|---|---|
| 1 | 0 | 32.0 | 22.8 |
| 2 | 32.0 | 0 | 15.2 |
| 3 | 22.8 | 15.2 | 0 |

For example, in table 1, if the subscriber originated two successive calls from cell site 106-1 and cell site 106-3, table 1 indicates that the spatial distance between these two cell sites translates to a time difference of 2.9 time units. If the call originations between the successive calls is less than the 2.9 units, then it is likely that there are actually two subscribers making use of this particular subscriber identification. Therefore, processing would advance to step 409 where the validation process is activated. If however, at step 406, the time differences do not indicate an obvious anomaly, processing advances to step 407 where the usage pattern for this particular subscriber unit is monitored to determine if the usage activity is indicative of fraudulent call origination behavior. In particular, there are numerous usage patterns that can be associated with call fraud and these typical usage patterns are stored in the memory of the verification system in order to identify suspect behavior. A typical usage pattern that is suspect is the rapid origination of a number of calls, or an excessive number of long distance calls, or a significant change in call usage pattern. Any of these particular anomalies, if severe enough, cause processing to advance to step 409 where the validation process is activated in order to determine whether a bogus subscriber is making use of this subscriber identification. At step 408, the validation process reviews all of the collected data and makes a fraud determination to decide whether sufficient data relating to fraudulent call activity has been collected in order to make an accurate fraud determination. If no fraud is detected, processing returns to the normal call connection processing and the validation process is terminated. If however at step 408 the collected data indicates obvious anomalies or suspect subscriber behavior, the validation process is activated at step 409.

Figure 5:
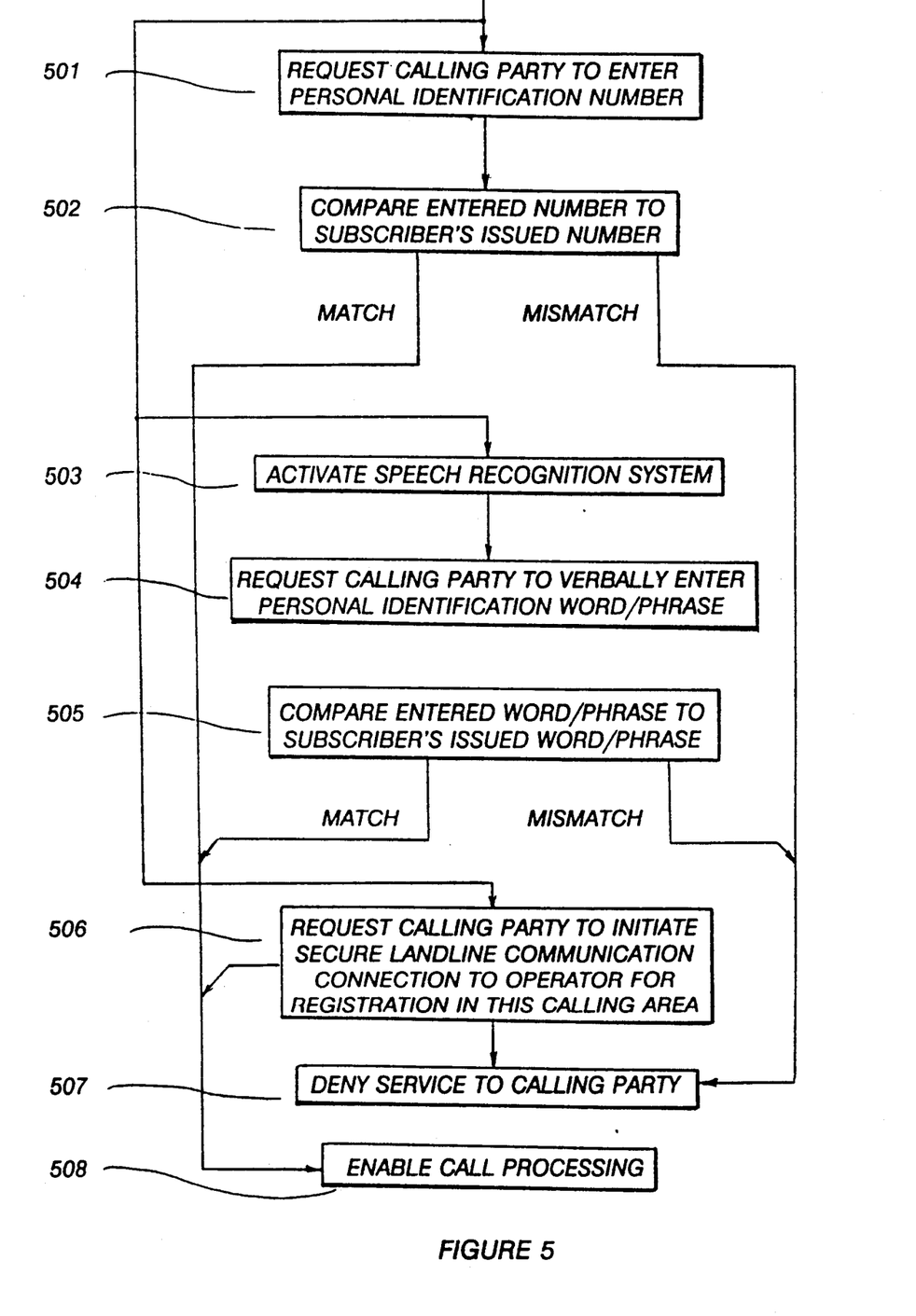

Validation process can consist of any one or a number of processes that are activated within the cellular telephone system as a result of the fraud detection process illustrated above in FIG. 4. FIG. 5 illustrates several possible validation procedures that can be activated when fraud is suspected. These procedures can be selected dynamically as a result of the probability of fraud as determined in the fraud detection process described above or can be selected by the cellular subscriber and associated with the subscriber identification number as part of an administration process or may even be selected by the cellular operating company. The first process is illustrated in step 501 wherein subscribers are required to enter a personal identification number code into the subscriber set prior to the initiation of the call. The personal identification number codes can be entered into the system through a variety of means including the use of star codes as part of the dialing sequence or the dialing of a special telephone number for the subscriber to validate the roaming subscriber unit before any call originations are permitted in the roaming area. An advantage of this approach is that the cellular radio frequency used to transmit the MIN/ESN during call setup is different than the one assigned for the subscriber to dial the personal identification number code digits therefore making it difficult for individuals to associate a personal identification number code with a corresponding MIN/ESN number assigned to that subscriber's cellular telephone unit. Therefore, unless the bogus unit is able to associate the personal identification number code with the MIN/ESN, the cellular telephone system could simply determine that this call is from a bogus subscriber and deny the requested service. A simplification of the dialing process can be implemented by the use of smart card which uses dynamically assigned personal identification number codes controlled by the XLI system as each subscriber enters a roaming cellular area.

Alternatively, at step 502, if a personal identification number code is not available to the subscriber, a speech recognition system can be used to validate subscriber identity before call originations are permitted for this particular subscriber unit. The speech patterns input to the system by the subscriber, as part of a code word or phrase screening process, are compared with digitized records stored in the home service area for the individual subscriber. A match of the preselected code word or phrase as well as recognition of the speech content minimizes the possibility that a bogus subscriber can fraudulently obtain service using this subscriber unit number. Finally, at step 503 off air registration is an alternative manner of validating the identity of the cellular subscriber. It is possible to intercept all cellular signals and use the information contained therein, including the personal identification number codes and the speech used by the subscriber, to pass the speech recognition test to defraud cellular carriers and it may be necessary to provide a more secure communication media in order to provide the subscriber validation process. In particular, when a subscriber roams into a remote service area, in order to obtain service in this area, the subscriber is required to use secure land line communications to telephone the subscriber clearinghouse operation in that particular service area or at the subscriber's home service area in order to receive authorization to originate and receive calls in the remote subscriber area. The use of any of these methodologies is illustrative of the type of personal verification capability that would be required in order to distinguish a valid subscriber from a bogus subscriber since it is easy to fraudulently use the MIN/ESN number associated with valid subscriber unit.

While a specific embodiment of this invention has been disclosed, it is expected that those skilled in the art can and will design alternate embodiments of this invention that fall within the scope of the appended claims.

I claim:

1. In a cellular mobile telephone system, wherein a plurality of mobile telephone switching offices, each of which serves a plurality of cell sites for establishing cellular cell connections with mobile subscriber units located in a geographical area covered by said cell sites, are connected to a subscriber verification system which validates the authorization of subscriber units, each of which is identified by a unique subscriber identification code assigned to said subscriber unit, to receive service when roaming outside of the subscriber's home mobile telephone switching office, apparatus in said subscriber verification system to detect subscriber identification code cloning comprising:

means, responsive to a one of said subscriber units originating a cellular cell connection, for storing data indicative of a subscriber unit identification code assigned to said one subscriber unit and real time call data associated with said cellular call connection; and means for detecting a temporal anomaly indicative of subscriber number cloning in said stored call data.

2. The apparatus of claim 1 wherein said detecting means includes:

means, responsive to a succession of cellular call connections from said one subscriber unit, for indicating said temporal anomaly when the frequency of said succession of cellular call connections exceed a predetermined threshold.

3. The apparatus of claim 1 wherein said detecting means includes:

means, responsive to a succession of cellular call connections from said one subscriber unit, for indicating said temporal anomaly when the cumulative duration of said succession of cellular call connections exceeds a predetermined threshold.

4. The apparatus of claim 1 wherein said detecting means includes:

means for indicating a temporal anomaly when more than one cellular call connection for said one subscriber unit with a single subscriber identification code are concurrently extant in said cellular mobile telephone system.

5. The apparatus of claim 1 wherein said detecting means includes:

means for indicating said temporal anomaly when two successive cellular call connections are originated from said one subscriber unit in said cellular communication system at spatially different locations, which call connection originations are temporally separated by a time difference inconsistent with said one subscriber unit traversing said spatial difference.

6. The apparatus of claim 5 wherein said indicating means includes:

means for calculating a time indicative of the minimum transit time of said one subscriber unit over a geographic distance between said spatially different locations; and means for identifying said temporal anomaly when said calculated minimum time is greater than said time difference.

7. The apparatus of claim 5 wherein said identifying means includes:

means for computing a geographic distance between said spatially different locations;

means for calculating a time indicative of the minimum transit time of said one subscriber unit over said computed geographic distance; and means for indicating said temporal anomaly when said calculated minimum time is greater than said time difference.

8. The apparatus of claim 1 further including:

means, responsive to said detected temporal anomaly for a call origination from said one subscriber unit, for terminating service to said one subscriber unit.

9. The apparatus of claim 8 wherein said terminating means includes:

means for transmitting a call denial message identifying said one subscriber unit to a mobile telephone switching office which covers a service area in which said one subscriber unit is presently located.

10. The apparatus of claim 8 wherein said terminating means includes:

means for transmitting data indicative of said one subscriber unit to an operator to identify the existence of said detected temporal anomaly.

11. The apparatus of claim 8 wherein said terminating means includes:

means for storing data identifying said one subscriber unit in a service denied memory to prevent said one subscriber unit from receiving cellular service on future call originations.

12. The apparatus of claim 1 further comprising:

means, responsive to said detected temporal anomaly for a call origination from said one subscriber unit, for transmitting a signal to said one subscriber unit requesting data indicative of a personal identification number that uniquely identifies a subscriber to whom said one subscriber unit is assigned; and means, responsive to the receipt of said requested data, for enabling said call origination if said received requested data matches a personal identification number stored in a memory in said apparatus.

13. The apparatus of claim 1 further comprising:

means, responsive to said detected temporal anomaly for a call origination from said one subscriber unit, for comparing voice transmissions from said one subscriber unit with stored voiceprint data that uniquely identifies a subscriber to whom said one subscriber unit is assigned; and means for enabling said cell origination if said voice transmission match said stored voiceprint data.

14. In a cellular mobile telephone system, wherein a plurality of mobile telephone switching offices, each of which serves a plurality of cell sites for establishing cellular call connections with mobile subscriber units located in a geographical area covered by said cell sites, are connected to a subscriber verification system which validates the authorization of subscriber units, each of which is identified by a unique subscriber identification code assigned to said subscriber unit, to receive service when roaming outside to the subscriber's home mobile telephone switching office, a method operational in said subscriber verification system to detect subscriber information code cloning comprising the steps of:

storing, in response to one of said subscriber units originating a cellular call connection, data indicative of a subscriber unit identification code assigned to said one subscriber unit and real time call data associated with said cellular call connection; and detecting a temporal anomaly indicative of subscriber number cloning in said stored call data.

15. The method of claim 14 wherein said step of detecting includes:

indicating, in response to a succession of cellular call connections from said one subscriber unit, said temporal anomaly when the frequency of said succession of cellular call connections exceeds a predetermined threshold.

16. The method of claim 14 wherein said step of detecting includes:

indicating, in response to a succession of cellular call connections from said one subscriber unit, said temporal anomaly when the cumulative duration of said succession of cellular call connections exceeds a predetermined threshold.

17. The method of claim 14 wherein said step of detecting includes:

indicating said temporal anomaly when more than one cellular call connection for said one subscriber unit with a single subscriber identification code are concurrently extant in said cellular mobile telephone system.

18. The method of claim 14 wherein said step of detecting includes:

indicating said temporal anomaly when two successive cellular call connections are originated from said one subscriber unit in said cellular communication system at spatially different locations which call connection originations are temporally separated by a time difference inconsistent with said one subscriber unit traversing said spatial difference.

19. The method of claim 18 wherein said step of indicating includes:

calculating a time indicative of the minimum transit time of said one subscriber unit over a geographic distance between said spatially different locations; and identifying said temporal anomaly when said calculated minimum time is greater than said time difference.

20. The method of claim 18 wherein said step of identifying includes:

computing a geographic distance between said spatially different locations;

calculating a time indicative of the minimum transit time of said one subscriber unit over said computed geographic distance; and indicating said temporal anomaly when said calculated minimum time is greater than said time difference.

21. The method of claim 14 further including:

terminating, in response to said detected temporal anomaly for a call origination from said subscriber unit, service to said one subscriber unit.

22. The method of claim 21 wherein said step of terminating includes:

transmitting a call denial message identifying said one subscriber unit to a mobile telephone switching office which covers a service area in which said one subscriber unit is presently located.

23. The method of claim 21 wherein said step of terminating includes:

transmitting data indicative of said one subscriber unit to an operator to identify the existence of said detected temporal anomaly.

24. The method of claim 21 wherein said step of terminating includes:

storing data identifying said one subscriber unit in a service denied memory to prevent said one subscriber unit from receiving cellular service on future call originations.

25. The method of claim 14 further comprising the steps of:

transmitting, in response to said detected temporal anomaly for a call origination from said one subscriber unit, a signal to said one subscriber unit requesting data indicative of a personal identification number than uniquely identifies a subscriber to whom said one subscriber unit is assigned; and enabling, in response to the receipt of said requested data, said call origination when said received requested data matches a personal identification number stored in a memory in said subscriber verification system.

26. The method of claim 14 further comprising the steps of:

comparing, in response to said detected temporal anomaly for a call origination from said one subscriber unit, voice transmissions from said one subscriber unit with stored voiceprint data that uniquely identifies a subscriber to whom said one subscriber unit is assigned; and enabling said call origination if said voice transmissions match said stored voiceprint data.

* * * * *